R. W. BURNETT.
CAR TRUCK.
APPLICATION FILED OCT. 4, 1912.
1,149,181. Patented Aug. 10, 1915.
3 SHEETS—SHEET 2.
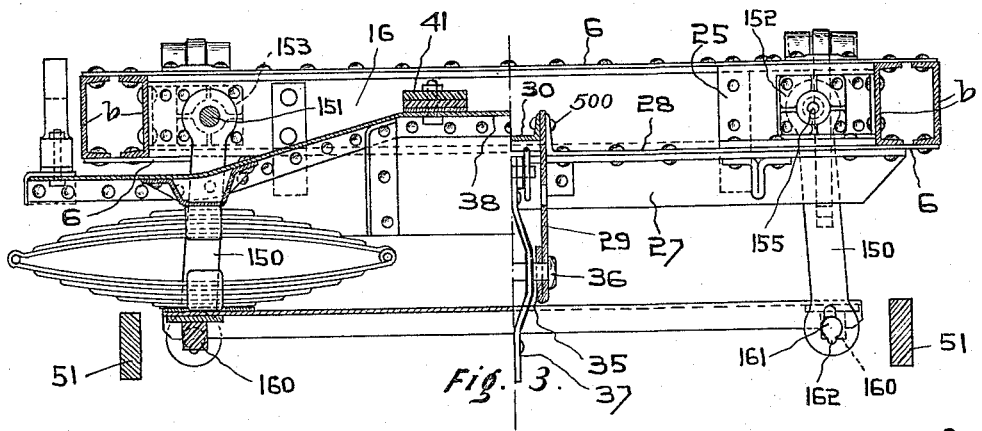
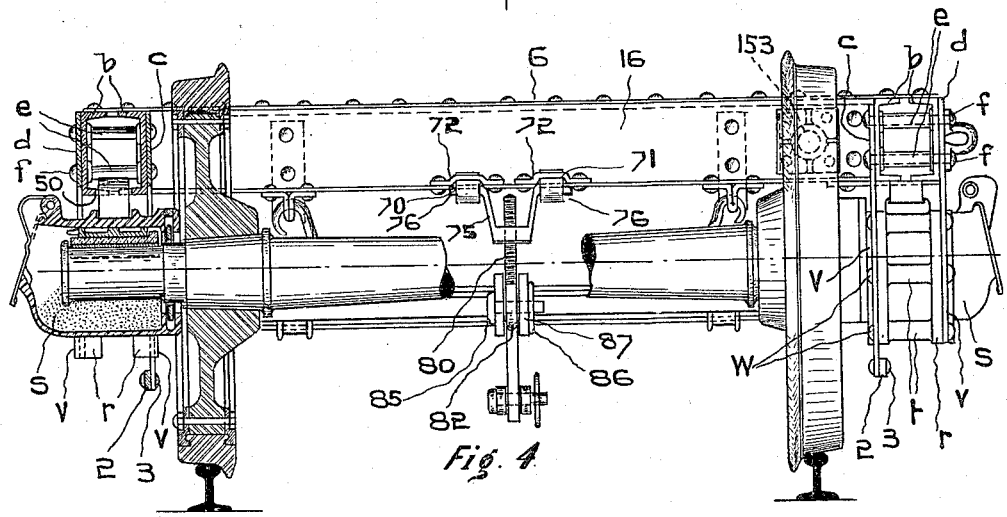
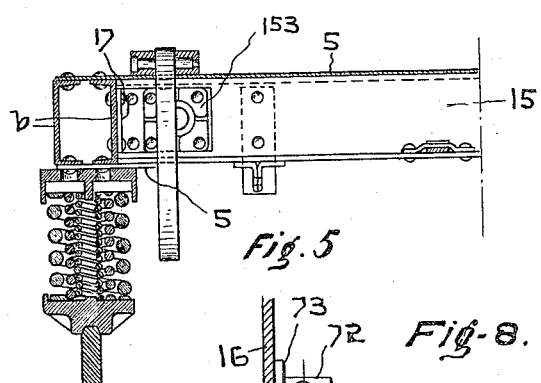
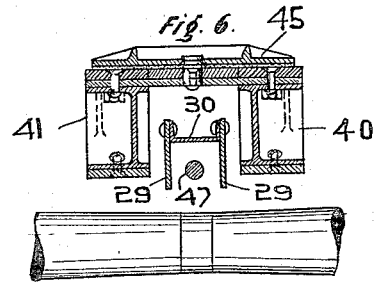
Witnesses.
Richard W. Burnett,
Inventor
per Attorney.

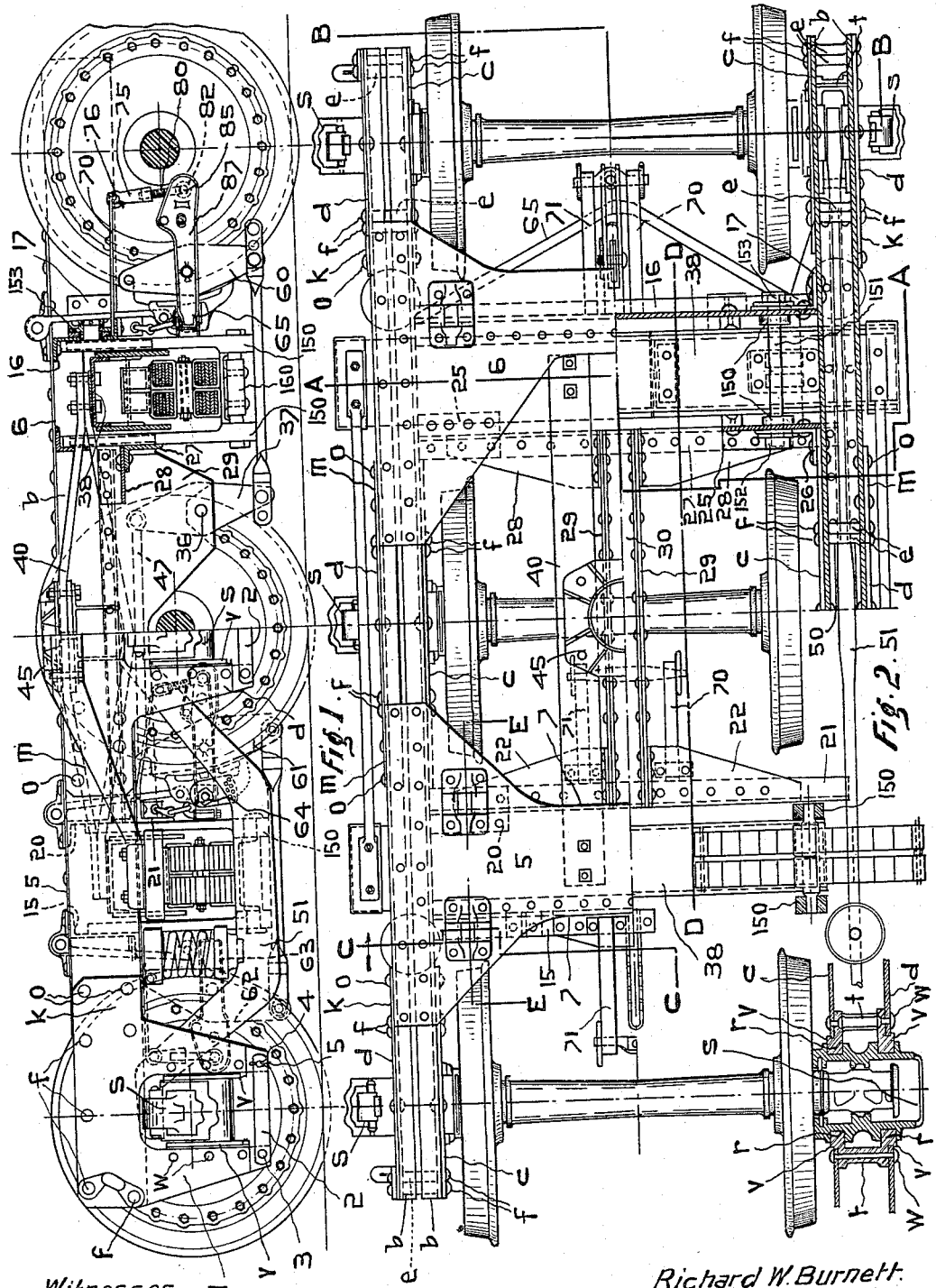

R. W. BURNETT.
CAR TRUCK.
APPLICATION FILED OCT. 4, 1912.
1,149,181.
Patented Aug. 10, 1915.
3 SHEETS—SHEET 3.
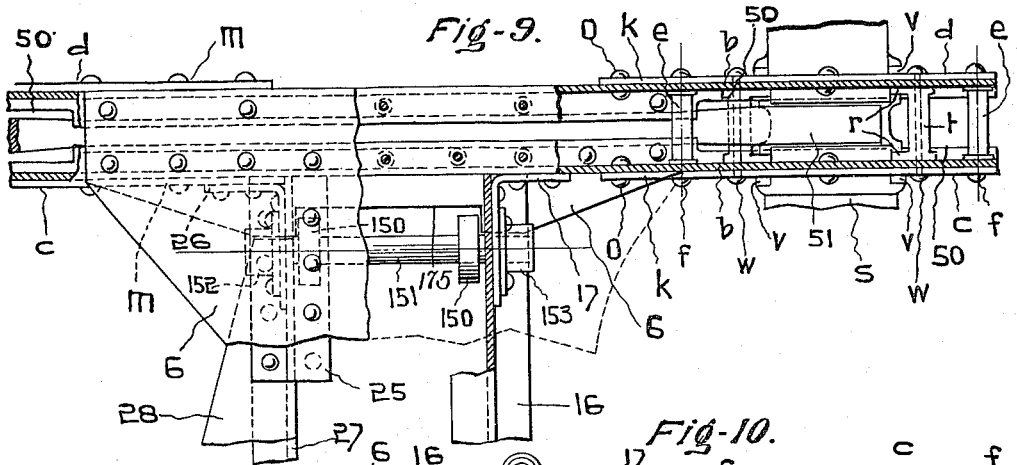
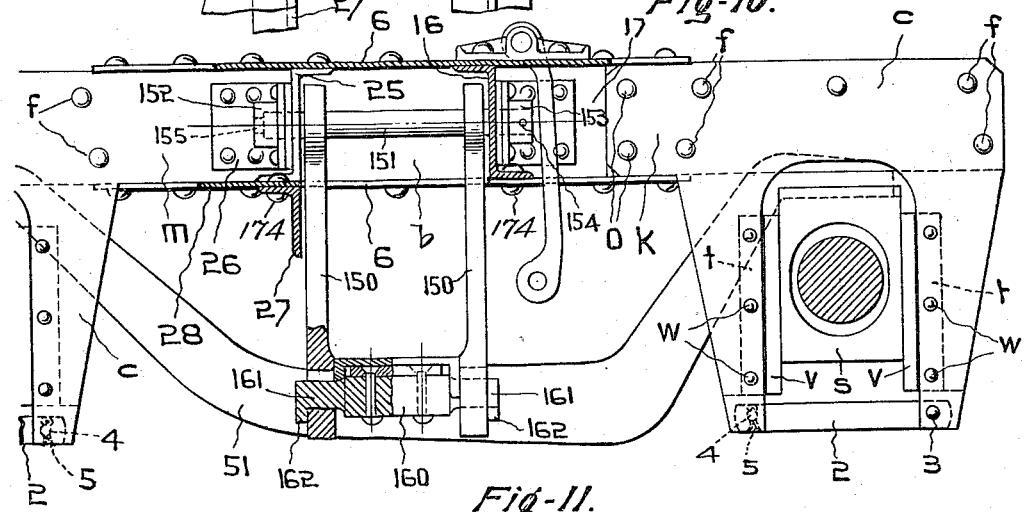
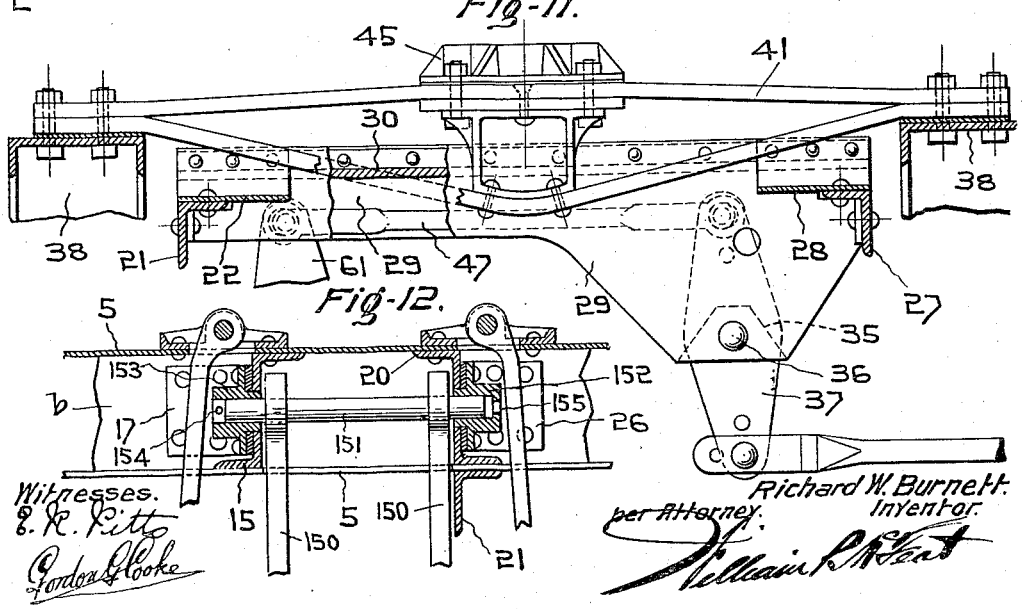

UNITED STATES PATENT OFFICE.

RICHARD WEBB BURNETT, OF MONTREAL, QUEBEC, CANADA.

CAR-TRUCK.

1,149,181.  Specification of Letters Patent.  Patented Aug. 10, 1915.

Application filed October 4, 1912. Serial No. 723,885.

*To all whom it may concern:*

Be it known that I, RICHARD WEBB BURNETT, a citizen of the United States of America, residing at the city of Montreal, in the Province of Quebec, Dominion of Canada, have invented new and useful Improvements in Car-Trucks, of which the following is a specification.

The trucks for passenger cars have hitherto been constructed either of composite metal and wood which has developed weakness by taking a permanent set, or of cast metal which develops blow holes and other defects during the manufacture impossible to detect by subsequent inspection.

The object of this invention is to provide a passenger-car truck free of the above mentioned defects and the members whereof will be more effectively held in the relative positions in which they are assembled, and a truck which will be stronger and of less weight than any trucks heretofore produced.

Other objects are to secure ease of inspection, to have the brakes hung from points between the axles for the purpose of doing away with the end sills and keep the truck end open for the accommodation of the axle-driven electric lighting system the absence of the end sill and outside brake beams affording ample room.

Previous six wheel truck constructions embodied pedestal straps extending continuously from one end sill beneath and bolted to all three pedestals, to the opposite end sill, and cross-tie bars fastened together the pedestal straps at opposite sides of the truck, these long straps and tie-bars being necessary in order to stiffen the truck-frame owing to its composite or cast construction; and in order to change wheels it was necessary to remove the pedestal-tie-straps and cross tie-bars and to disconnect and remove part of the brake connections on account of the latter being located under the axles thus necessitating a large amount of labor owing to the many nuts and cotters to be removed.

Another object of the invention is to obviate this labor and reduce the weight of the truck which I do by dispensing with the straps and substituting therefor a retaining bar for each pedestal and adapting it to retain the journal box within the pedestal.

Another object of the invention is to reduce the length over all of the truck, and at the same time, increase the wheel base to accommodate the brake beams between the axles.

For full comprehension, however, of my invention reference must be had to the accompanying drawings forming a part of this specification in which similar reference characters indicate the same parts, and wherein:

Figure 1 is a side elevation partly in sectional vertical view of my improved six wheeled passenger car truck; Fig. 2 is a plan view thereof partly in horizontal section; Fig. 3 is a transverse sectional view taken on line A A Fig. 2; Fig. 4 is a part end elevation and part vertical sectional view, the sectional view being taken on line B B Fig 2; Fig. 5 is a detail transverse vertical sectional view taken on line C C Fig. 2; Fig. 6 is a transverse vertical sectional view taken through the center plate; Fig. 7 is a detail elevation of the middle portion of one of the axles. Fig. 8 is a detail view of one of the springs in the brake beam adjusting device; Fig. 9 is a plan view of the end portion of one of the side sills with gusset plates attached thereto the top gusset plate being broken away and one of the transoms and the side sill appearing in horizontal section; Fig. 10 is a detail side elevation of the end portion of the truck frame; Fig. 11 is a side elevation partly in section of the baby bolster; and Fig. 12 is a view partly in elevation and partly in section of the brake-hangers.

The truck frame comprises side sills each consisting of a pair of channels $b$, $b$, disposed with their troughed sides facing each other. These sills are of just sufficient length to carry end pedestals with the axle boxes straddled thereby, middle pedestals being carried by the middle of the sills. Each of the pedestals consist of a pair of plates $c$ and $d$ fastened to opposite sides of the sills by long rivets $f$ passed through the pedestal plates the webbs of the sills and tubular distance pieces $e$ spacing the channels.

The end pedestal plates have lateral extensions $k$ toward the truck middle and each of the middle pedestal plates have a pair of extensions $m$ toward the ends, such extensions being along the webs of the sills and being fastened to the latter by short rivets $o$.

Two pairs of retaining ribs r for each of the journal boxes, indicated at s, are presented by cast fillers t, the outer side edges of such ribs forming flanges v over-reaching the pedestal plates between which these fillers are rigidly secured by rivets w extending through both pedestal plates and the fillers. The lower ends of the horns of the inner plates c of each pedestal extend below the spacers and carry a retaining bar 2 pivoted at one end by a rivet 3 to one horn and having its opposite end perforated to fit over a stud 4 carried by the other horn and locked in engagement therewith by a cotter pin 5. These bars serve to limit the relative vertical displacement of the journal boxes and pedestals and at the same time permit ready disconnection of these parts without otherwise dismembering the truck by simply taking out the cotters and allowing the bars to swing on their pivots in order to accommodate these bars the horns of the inner pedestal plates are made longer than those of the outer pedestal plates.

The side walls are united and relatively braced by transoms to be presently fully described and a pair of gusset plates 5, 5', and 6, 6' covering and riveted to the top and bottom flanges of both channel irons of each side sill. These gusset plates are arranged at opposite sides of the truck center and are of sufficient width at their ends to overlap the lateral extensions of the pedestal thus affording with the latter an effective reinforcement extending continuously from end to end of the sills. The gusset plates 5, at one side of the truck center are reduced in width between their ends by cutting away each side uniformly to afford clearance at one side, 7, for the draft gear, such gusset plates being also arranged in juxtaposition with one of the truck bolsters to be presently further alluded to. The other gusset plates 6 have their portions between their ends set back from the truck center to allow the baby bolster, to be further alluded to, to be removed.

The underside gusset plates 5' and 6' do not extend across the full width of the truck but are extended out to overlap the transoms where they are riveted at 174 and they are notched at 175 to accommodate the truck hangers 150.

The transoms before mentioned comprise a pair 15 and 16 of Z cross-section extending continuously in one piece from side sill to side sill and are secured rigidly thereto by angle brackets 17 riveted in place; and a second pair of transoms extend in like manner are built up and of different specific construction one being placed adjacent to the transom 15 and the other adjacent to the transom 16. The one adjacent to transom 15 consists of a pair of short sections 20 of Z cross-section secured to the side sills by riveted angle brackets similar to the brackets 17, the sections 20 being united and the transom completed by a bar 21 of angle cross-section between which and the end sections 20 a pair of webs or plates 22 are held. The transom adjacent to the transom 16 consists of a pair of short sections 25 of Z cross-section fastened to the side sills by riveted angle brackets 26, and a bar 27 of angle cross-section riveted to the end sections 25 with a pair of webs or plates 28 (Fig. 3) which have their inner ends upturned and riveted as at 500 to the flanges of a channel iron 30 to be further alluded to, held between them. These webs or plates 28 are termed secondary transom connections and have their inner ends turned upwardly as shown in Figs. 1, 2, and 11 and riveted to a pair of parallel longitudinal webs or plates 29 (Figs. 3 and 10) joined together at their upper edges by a member 30 of channel cross-section to which they are riveted. The portions of these webs or plates 29 extend in width between the middle axle and the transom 27 and their lower ends are reinforced by being turned up as at 35, (Fig. 3) and the pivot pin 36 of one 37 of the four brake levers is journaled in a bearing therein. The member thus constructed although affording a support for one of the brake levers has for its principal object to reinforce the transoms against the end thrust of the truck bolsters indicated at 38.

The members 40 and 41 of the baby bolster are located one at each side of the transom reinforcing member and, as usual, are riveted at their ends to the bolsters and between them carry the center plate 45. The relative arrangement of these parts is clearly shown in Fig. 6 where it will be seen that the brake rod 47 has ample clearance.

In order to permit the side sills to be set in a lower plane the lower flanges in the vicinity of the pedestals are cut away as shown at 50 in Fig. 9 to accommodate the equalizer bars 51. The lateral extensions of the pedestal plates compensate for the loss of metal by cutting away the flanges of the side sills as just mentioned.

There are as usual in six wheel trucks four brake levers, 37, above mentioned, 60, 61, and 62. These levers are eqaul in length and consequently have equal power in transmitting power to the brake beams. The three last mentioned levers carry the brake beams which are indicated at 63, 64 and 65 respectively, and each being fulcrumed in an independent brake beam adjusting device and they are all located within the wheel base. This brake beam adjusting device consists of a pair of springs 70, 71 clamped by riveted straps 72 to the outer flanges of the transom the inner ends of the springs being turned up as at 73 to keep them from pulling out. A yoke 75 has its legs turned upwardly and outwardly as at 76 with their ends rounded and projecting through the eyes formed by the rolled ends of the springs. The yoke is tapped to have an adjusting screw 80 threaded therethrough and having an eye 82 at its center end held by pins 85, cotter 86, between the arms 87 constituting a brake-beam fulcrum and strut. To adjust the angle of the beam relatively to the wheels the cotter is removed and the pin and eye-bolt displaced and the latter screwed to the desired position, after which the eye-bolt, pin and cotter are returned.

The truck hangers, indicated at 150 (Fig. 3) are suspended from hanger pins 151 projecting through holes in the transoms and angle brackets and entering at one end into inwardly facing sockets in castings 152 secured upon the angle brackets 26 by rivets fastening such castings and angle brackets to the transom members 25, the opposite ends of the pins being supported in castings 153 secured upon the angle bracket 17 in the same manner as the casting 152 is secured over the angle bracket 26. These castings 153 have openings completely therethrough for the insertion of the pins and small holes 154 for cotter pins or rivets to prevent the pins 151 from working out, while the castings 152 have holes 155 through which drift pins may be driven to displace the pins 151. The lower ends of these hangers are connected to the spring-plank supporting bars 160 by studs 161 having lugs 162 at their outer extremities the hangers having openings with lateral extensions to fit over the studs and lugs, after which the bars are turned to position with the lugs overlapping the hanger and preventing displacement thereof.

The relative arrangement of the side sills, pedestals, transoms and the longitudinal brace 30 between the latter secures greater rigidity with less danger of being distorted and throwing the braces out of proper bearing relation with the journals. Other advantages are ease of inspection owing to the ample spaces between the parts, shortening of the truck frame and lengthening of the wheel base, and owing to the concentration of the strength in the side sills and transoms by the relative arrangement of the gusset and pedestal plates, the end sills are dispensed with and the ample room is provided for the axle driven electric lighting system the driving wheel of which is shown on one of the axles in Fig. 2.

What I claim is as follows:—

1. A railway car truck comprising side sills united by spaced transverse members of Z cross-section located inward from the ends of the side sills, axles adjacent at each end of the frame and an axle midway between the ends of such frame, wheels upon the axles.

2. A railway car truck comprising side sills, spaced transoms of Z cross-section located inward from the ends of the sills, gusset plates in juxtaposition with the transoms and overlapping and secured to the side sills, axles adjacent at each end to the frame and an axle midway between the ends of such frame, wheels upon the axles.

3. A railway truck comprising side sills, spaced transoms of Z cross-section located inward from the ends of the sills, gusset plates in juxtaposition with the transoms and overlapping and secured to the side sills, such gusset plates having their ends widened, axles adjacent to each end of the frame and an axle midway between the ends of such frame, wheels upon the axles.

4. In a railway truck comprising side sills, spaced transverse members of Z cross-section united at their ends to the side sills and overlapping the same, such members being located inward from the ends of the sills, pairs of pedestal plates secured at the ends of the sills and midway of the length thereof and lapping joints with the transverse members, means relatively bracing the pedestal plates of each pair, and axles and journal boxes assembled with the pedestals.

5. A railway truck comprising side sills, spaced transoms of Z cross-section located inward from the ends of the sills, gusset plates in juxtaposition with the transoms and overlapping and secured to the side sills, pairs of pedestal plates secured at the ends of the sills and midway of the length thereof and lapping joints with the gusset plates, means relatively bracing the pedestal plates of each pair, axles and journal boxes assembled with the pedestals.

6. A railway truck comprising side sills, spaced transoms located inward from the ends of the sills, gusset plates in juxtaposition with the transoms and overlapping and secured to the side sills, such gusset plates having their ends widened, pairs of pedestal plates secured at the ends of the sills and midway of the length thereof and lapping joints with the gusset plates, means relatively bracing the pedestal plates of each pair, axles and journal boxes assembled with the pedestals.

7. A railway car truck comprising side sills, spaced transoms of Z cross-section located inward from the ends of the sills, gusset plates in juxtaposition with the transoms and overlapping and secured to the side sills, a longitudinal brace united at its ends and relatively bracing the transoms, axles adjacent at each end to the frame and an axle midway between the ends of such frame, wheels upon the axles.

8. A railway car truck comprising side sills, spaced transoms located inward from the ends of the sills, gusset plates in juxtaposition with the transoms and overlapping and secured to the side sills, a longitudinal brace united at its ends to and relatively bracing the transoms, such longitudinal brace comprising a member of channel cross-section extending from transom to transom, a pair of plates equal in length and riveted to the channel, a pair of plates extending at right angles to each end of the said longitudinal brace and riveted thereto and to the transom, axles adjacent to each end of the frame and an axle midway between the ends of such frame and wheels upon the axles.

9. A railway truck frame comprising in combination with a pair of side sills, a pair of transoms of Z cross-section located inward from the ends of the side sills and consisting of a single piece extending from side sill to side sill, means securing the ends of such transoms rigidly to the side sills, a second pair of transoms parallel and adjacent to the first mentioned pair and each consisting of a pair of alined short members of Z cross-section rigidly secured to the side sills, a member of angle cross-section extending from side sill to side sill beneath and riveted to the said short members, a member of channel cross-section extending longitudinally and centrally of the frame from one to the other of said members of angle cross-section and overlapping the same, a pair of spaced alined transverse plates riveted upon each of the said members of angle cross-section and having their contiguous ends turned upwardly and riveted to the flanges of the channel, a pair of gusset plates with widened ends located over the transoms near one end of the frame and the other offset with relation to the transoms near the other end of the frame, pairs of pedestal plates riveted to opposite sides of the sills and lapping joints with the said gusset plates and means relatively bracing the pedestal plates of each pair.

10. A railway truck frame comprising in combination with a pair of side sills, a pair of transoms of Z cross-section located inward from the ends of the side sills and consisting of a single piece extending from side sill to side sill, means securing the ends of such transoms rigidly to the side sills, a second pair of transoms parallel and adjacent to the first mentioned pair and each consisting of a pair of alined short members of Z cross-section rigidly secured to the side sills, a member of angle cross-section extending from side sill to side sill beneath extending from side sill to side sill beneath and riveted to the said short members, a member of channel cross-section extending longitudinally and centrally of the frame from one to the other of said members of angle cross-section and overlapping the same, a pair of plates equal in length and riveted at their upper edges to the channel and having one end extending downwardly and formed with a boring, a pair of spaced alined transverse plates riveted upon each of the said members of angle cross-section and having their contiguous ends turned upwardly and riveted to the flanges of the channel and the plates riveted to the latter, a pair of gusset plates with widened ends one located over the transoms near one end of the frame and the other offset with relation to the transoms near the other end of the frame, pairs of pedestal plates riveted to opposite sides of the sills and lapping joints with said gusset plates, and means relatively bracing the pedestal plates of each pair.

11. In a truck the combination with one of the transoms thereof, of bolster hanging mechanism comprising a pair of castings rigidly secured to opposite sides of the transoms, one having a socket opening toward the transom and the other having a free opening, and the transom having openings registering with the socket and the opening in the castings, a pin inserted through and bearing in the open casting and through the transom and bearing at its opposite end in the socket, means preventing axial displacement of the pin, a bolster within the transom, a spring plank, springs supporting the bolster upon the spring plank and truck hangers supported by the pin between the transom and opposite sides of the bolster, and means connecting the lower ends of the hangers to the spring plank.

In testimony whereof I have signed my name to this specification in the presence of two witnesses.

RICHARD WEBB BURNETT.

Witnesses:
E. R. PETTS,
W. HEWETSON.

Copies of this patent may be obtained for five cents each, by addressing the "Commissioner of Patents, Washington, D. C."